Feb. 24, 1953 D. W. WRIGHT 2,629,633
HOSE NOZZLE
Filed July 23, 1951

INVENTOR.
DONALD W. WRIGHT
BY
Hazard & Miller
ATTORNEYS

Patented Feb. 24, 1953

2,629,633

UNITED STATES PATENT OFFICE 2,629,633

HOSE NOZZLE

Donald W. Wright, Rosemeade, Calif.

Application July 23, 1951, Serial No. 238,036

7 Claims. (Cl. 299—136)

This invention relates to improvements in hose nozzles.

A primary object of the invention is to provide a highly versatile nozzle attachable to a garden hose which is so designed that (1) the flow of water through the nozzle can be regulated by the nozzle or shut off entirely; (2) the stream of water discharged may be in the nature of a thin but forceful stream; (3) the stream discharged from the nozzle may be in the form of a fine spray; or (4), the stream discharged may be in the form of a wide stream having no great velocity and suitable for flooding purposes.

Another object of the invention is to provide a nozzle which, although it has threads to adjust the positions of the various parts thereof, has these threads entirely enclosed within the nozzle so that none of the threads will be exposed to dirt which might work between the threads and gall them or otherwise reduce the life of the nozzle.

Still another object of the invention is to provide a nozzle wherein the outer end of the nozzle is threaded for the application either of an additional hose length or various types of spraying devices for spraying insecticides and the like, and utilizing water pressure for this purpose.

Still another object of the invention is to provide a hose nozzle of relatively simple and durable design which can be easily and economically manufactured.

Figure 1:
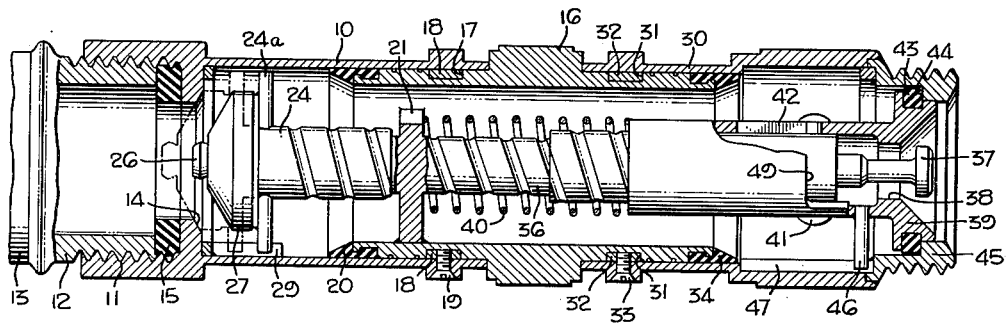
Figure 2:
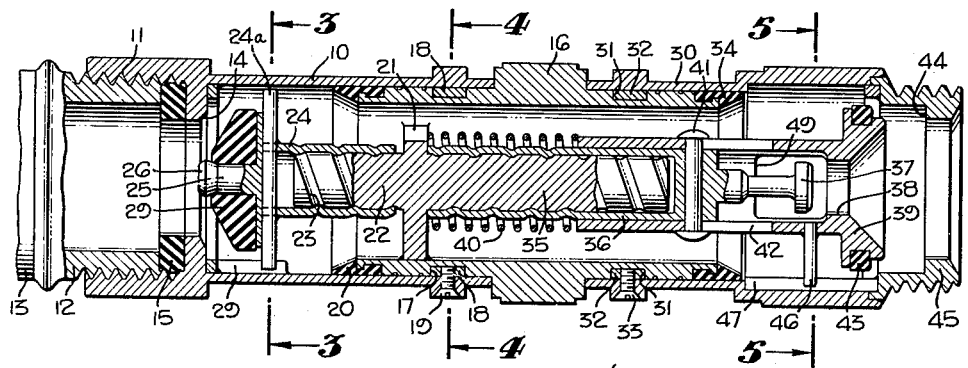
Figure 3:
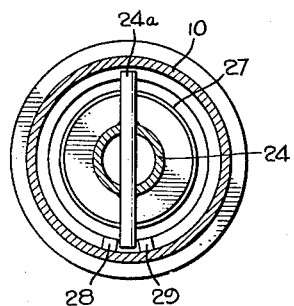
Figure 4:
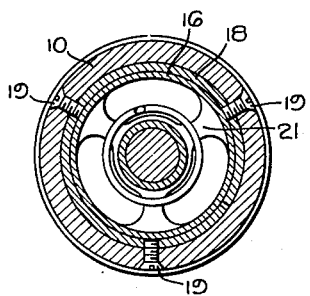
Figure 5:
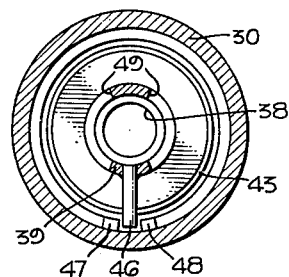

With the foregoing and other objects in view, which will be made manifest in the following detailed description and specifically pointed out in the appended claims, reference is had to the accompanying drawings for an illustrative embodiment of the invention, wherein:

Figure 1 is a longitudinal vertical section through the nozzle embodying the present invention illustrating parts thereof in one position;

Fig. 2 is a view similar to Fig. 1, but illustrating the parts of the nozzle in one position; and Figs. 3, 4, and 5 are vertical sections taken substantially upon the lines 3—3, 4—4, and 5—5, respectively, on Fig. 2.

Referring to the accompanying drawing wherein similar reference characters designate similar parts throughout, the improved nozzle consists of a sleeve 10 internally threaded as at 11 for attachment to the coupling 12 on a hose end of a hose 13. Within the sleeve 10 there is formed a valve seat 14. The conventional hose washer 15 is shown as disposed between the hose coupling 12 and the internal shoulder on the sleeve 10 on which the valve seat 14 is formed. A barrel 16 has one end thereof telescopically disposed within the sleeve 10 and is rotatably mounted thereon. This barrel is externally grooved as indicated at 17 to receive a split ring 18. One or more screws 19 extend through the sleeve 10 into the split ring 18. As the split ring 18 is freely slidable within the groove 17, this connection afforded by the screws 19 and the ring 18 enables the barrel 16 to be rotated relatively to the sleeve 10, although it will be held against longitudinal displacement relatively thereto. A rubber sealing ring 20 is mounted on the inner end of the barrel 16 and is engageable with the interior of the sleeve and serves to prevent leakage between the sleeve and the barrel.

Within the barrel 16 there is disposed a spider 21 that is rigidly secured in position therein such as by soldering or brazing. This spider carries a stem 22 which is threaded with relatively coarse threads 23. Preferably, the threads on the stem 22 are in the nature of grooves cut thereon. A closure is threaded onto the stem consisting of a sheet metal sleeve 24 that is provided with threads which are complementary to the threads 23. These threads are preferably formed by rolling or inwardly deforming the metal of the sleeve 24. The sleeve 24 carries a pin 25 having a head 26, and a washer 27 which constitutes the closure is slipped onto the pin 25 by being stretched slightly over the head 26. This washer is formed of rubber or rubber-like material so as to possess some degree of elasticity and when released it contracts about the pin 25 and is consequently retained thereon by the head 26.

The sleeve 24 has secured thereto a diametrically extending pin 27, one end of which is slidably disposed between guides 28 and 29 that are rigid with the interior of the sleeve 10. The pin 27 and the guides 28 and 29 thus provide a connection between the closure formed by the sleeve 24 and the washer 27 and the sleeve 10, which holds the closure against rotation relatively to sleeve 10 although permitting longitudinal movement of the closure with respect to the sleeve. Consequently, if the barrel 16 is rotated relatively to the sleeve 10 the stem 22 will be turned with the barrel, causing the sleeve 24 and the washer 27 to be moved toward or away from the seat 14 depending upon the direction of rotation of the sleeve 16. In extreme position the washer 27 seats on the seat 14 as indicated in dotted lines on Fig. 1, thus shutting off flow through the nozzle entirely. On the other hand, if the barrel 16 is rotated in the opposite direction from this extreme position the closure may be retracted from the seat 14 a variable distance so as to regulate the volume of flow through the nozzle. In this manner flow through the nozzle can be regulated at the nozzle itself as distinguished from the conventional hose nozzle wherein the flow through the nozzle must be regulated by regulating the faucet to which the hose is connected.

A second sleeve 30 is provided into which the other end of the barrel 16 telescopically extends. This end of the barrel 16 is likewise grooved as at 31 to receive a split ring 32. One or more screws 33 extend through the second sleeve 30 into the split ring 32, thus forming a rotatable but non-slidable connection between the second sleeve 30 and the barrel 16. Leakage between the second sleeve and the barrel may be prevented by a sealing ring 34 that is applied to the extreme end of this end of the barrel 16. The spider 21 also serves to support a threaded stem 35 that is similar in formation to the stem 22 but which extends toward the outer end of the nozzle. A sleeve 36 having thread formations formed on its interior, such as by rolling is threadedly mounted on this second stem 35. The sleeve 36 carries a head 37 that is capable of passing through the orifice 38 of a surrounding throttling nozzle 39. The throttling nozzle has a tubular portion that is slidably disposed over the sleeve 36. It is urged into its outermost position by a light compression spring 40, although the use of this compression spring is not invariably essential. The throttling nozzle has a slidable but non-rotatable connection with the sleeve 36, this being provided by a rivet 41 extending diametrically through the closed end of the sleeve 36 and into diametrically opposed slots 42 formed in the sides of the tubular portion of the throttling nozzle. The throttling head has an outwardly extending flange in which is disposed a sealing ring 43 adapted to engage and seat on a seat 44 on a nipple 45 that is attached to the outer end of the second sleeve 30 and rendered rigid therewith. Preferably, the outer end of the throttling nozzle is beveled outwardly around the orifice 38.

Means is provided for forming a slidable but non-rotatable connection between the throttling nozzle 39 and the second sleeve 30. To this end the throttling nozzle is equipped with a laterally extending pin 46, the end of which is disposed between ways 47 and 48 that are rigid with the interior of the second sleeve 30. The nipple 45 is preferably externally threaded either for the application of an additional hose length or for the application of various types of spraying devices that are applicable to a hose coupling 12. These spraying devices frequently utilize water pressure to discharge insecticides, fungicides, and the like, and may be applied to the nipple 45 without requiring detachment of the nozzle from the hose coupling 12.

The operation of the improved nozzle is substantially as follows.

As previously explained rotation of the barrel 16 with respect to the sleeve 10 will involve movement of the closure provided by the washer 27 toward or away from the seat 14. Thus flow through the nozzle can be regulated or completely shut off by the rotation of the barrel 16. When the flow has been regulated to the desired volume the type of spray or stream discharged can be adjusted by rotation of the second sleeve 30 with respect to the barrel 16. Rotation of the second sleeve 30 in one direction causes the throttling nozzle 39 to rotate therewith and as the throttling nozzle has a non-rotatable connection with the throttling head 37 the throttling head will be caused to rotate therewith with respect to the stem 35.

In Fig. 1, the throttling head 37 is shown in its extreme forward position and in its extreme position the throttling nozzle 39 is seated on the seat 44. Flow through the nozzle consequently can only take place through apertures 49 in the sides of the throttling nozzle and through orifice 38. In this position the stream that issues from the nozzle is in the form of a finely divided, conical spray. If the second sleeve 30 is then rotated to rotate the throttling nozzle 39 and consequently the throttling head 37, the throttling head may be caused to assume a position retracted through the orifice 38 but leaving the throttling nozzle 39 still seated on the seat 44. In this position flow is still confined through the apertures 49 and the orifice 38 but by reason of the retracted position of the throttling head 37, the stream that issues through the orifice 38 will be in the nature of a relatively narrow, solid stream of high velocity. If rotation of the second sleeve 30 is continued the throttling head 37 will be retracted to the position shown in Fig. 3, where the ends of the rivet 41 reaching the ends of the slots 42 will retract the throttling nozzle 39 from the seat 44. In this position flow may take place partially through the apertures 49 and the orifice 38 and partially around the throttling nozzle so that the stream that issues from the nipple 45 will be a full stream of relatively low velocity suitable for flooding purposes.

From the above-described construction it will be appreciated that the improved nozzle is highly versatile in that flow through the nozzle can be regulated at the nozzle itself or shut off completely. Furthermore, by the adjustment of the second sleeve 30 relatively to the barrel 16, either a fine conical spray may be delivered, a narrow, solid stream of high velocity can be delivered, or a wide full stream of low velocity may be delivered. The design is such that although threaded connections are employed at the stems 22 and 35, these threads are housed within the nozzle. No portions of them are exposed on the exterior of the nozzle and, consequently, they are not subject to damage or dirt which might work into the threads if the nozzle were dropped into mud or the like.

Once that the nozzle is attached to a hose it may be permitted to remain attached thereto indefinitely inasmuch as the flow issuing from the nozzle when it is adjusted into the position shown in Fig. 2 is very much the same as the flow that issues from a garden hose with no nozzle attached whatsoever.

The stems 22 and 35 may be formed integral with the spider 21 and the spider secured in position within the barrel 16. In the alternative, the stems 22 and 35 may be made integral with each other and fitted into the spider 21 with a force fit, the spider 21 being made as a stamping. Also it is possible to construct the barrel 16 with the spider 21 integral therewith and force the stems 22 and 35, which are integral with each other, into the spider with a force fit.

Various changes may be made in the details of the construction without departing from the spirit and scope of the invention as defined by the appended claims.

I claim:

1. A hose nozzle comprising a sleeve attachable to a hose, a seat therein, a barrel rotatably mounted upon the sleeve, a threaded stem supported by the barrel coaxially therein extending toward the seat in the sleeve, a valve closure threaded onto the stem adapted to seat upon the seat, means on the closure engageable with the barrel for holding the closure against rotation relative to the sleeve whereby upon rotation of the barrel relative to the sleeve the valve closure may be moved toward or away from its seat to regulate or completely shut off flow through the nozzle, a second sleeve rotatably mounted upon the barrel, a seat within the second sleeve, a second threaded stem supported within the barrel extending toward the second sleeve, a throttling nozzle within the second sleeve adapted to seat on a seat therein, means connecting the throttling nozzle to the second sleeve preventing rotation but permitting longitudinal movement of the throttling nozzle relatively thereto, a throttling head threaded onto the second stem movable through the throttling nozzle to regulate the flow therethrough, and means connecting the head to the throttling nozzle preventing rotation of the throttling nozzle relative to the head but permitting longitudinal movement relatively thereto.

2. In a hose nozzle, a barrel, a threaded stem mounted within the barrel coaxially with relation thereto, a sleeve mounted for rotation on the barrel presenting an internal seat, a throttling nozzle adapted to seat upon said seat having a slidable but non-rotatable connection with the sleeve, a throttling head threadedly mounted upon the stem and movable with relation to the throttling nozzle to regulate flow therethrough, and means forming a slidable but non-rotatable connection between the throttling nozzle and the throttling head whereby upon rotation of the sleeve relatively to the barrel the throttling head may be adjusted relatively to the throttling nozzle while the throttling nozzle is seated.

3. In a hose nozzle, a barrel, a threaded stem mounted within the barrel coaxially with relation thereto, a sleeve mounted for rotation on the barrel presenting an internal seat, a throttling nozzle adapted to seat upon said seat having a slidable but non-rotatable connection with the sleeve, a throttling head threadedly mounted upon the stem and movable with relation to the throttling nozzle to regulate flow therethrough, means forming a limited slidable but non-rotatable connection between the throttling nozzle and the throttling head whereby upon rotation of the sleeve relatively to the barrel the throttling head may be adjusted relatively to the throttling nozzle to regulate the flow therethrough or the throttling nozzle may be retracted from its seat by the throttling head, and spring means within the barrel urging the throttling nozzle toward its seat.

4. In a hose nozzle, a sleeve attachable to a hose coupling, a barrel rotatably mounted thereon, a threaded stem carried by the barrel and disposed coaxially therewith, a closure threaded onto the stem having a slidable but non-rotatable connection with the sleeve whereby upon rotation of the barrel relatively to the sleeve the closure may be shifted longitudinally with respect to the sleeve, and a seat on the interior of the sleeve engageable by the closure.

5. In a hose nozzle, a sleeve attachable to a hose coupling, a barrel rotatably mounted thereon, a threaded stem carried by the barrel and disposed coaxially therewith, a closure threaded onto the stem having a slidable but non-rotatable connection with the sleeve whereby upon rotation of the barrel relatively to the sleeve the closure may be shifted longitudinally with respect to the sleeve, and a seat on the interior of the sleeve engageable by the closure, said closure consisting of a body having a pin equipped with a head and a washer formed of elastic material stretched over the head and slipped onto the pin.

6. A hose nozzle comprising a sleeve attachable to a hose coupling, said sleeve having a seat therein, a barrel telescopically arranged within the sleeve, said barrel being grooved and having a split ring in its groove, means connecting the split ring to the sleeve thus forming a rotatable but non-slidable connection between the barrel and the sleeve, a spider within the barrel, a threaded stem secured to the spider so as to be rotatable with the barrel, a closure threaded onto the stem adapted to seat against the seat in the sleeve, a second sleeve telescoped onto the barrel, a split ring for the second sleeve recessed in a groove on the barrel, means connecting the split ring to the second sleeve forming a rotatable but non-slidable connection between the second sleeve and the barrel, a second stem secured to the spider and in opposed relationship to the first stem, a throttling head threadedly mounted upon the second stem, a throttling nozzle slidable between limits relatively to the throttling head, a seat on the second sleeve engageable by the throttling nozzle, means forming a slidable but non-rotatable connection between the throttling nozzle and the second sleeve, and means forming a slidable but non-rotatable connection between the throttling nozzle and the throttling head.

7. In a hose nozzle, a barrel having an external groove thereon, a ring in the groove, a sleeve telescopically arranged with relation to the barrel, means connecting the sleeve to the ring forming a rotatable but non-slidable connection between the sleeve and the barrel, a threaded stem coaxially arranged with the barrel and rigid therewith, a throttling head threaded onto the threaded stem, a throttling nozzle slidable between limits on the throttling head and having a non-rotatable connection therewith, a seat on the sleeve engageable by the throttling nozzle, and means forming a slidable but non-rotatable connection between the throttling nozzle and the sleeve.

DONALD W. WRIGHT.

REFERENCES CITED

The following references are of record in the file of this patent:

FOREIGN PATENTS

| Number | Country | Date |
|---|---|---|
| 113,160 | Australia | May 22, 1941 |
| 128,005 | Great Britain | Dec. 13, 1918 |